Dec. 30. 1924.
H. NEWMAN
1,521,122
COMBINED OPTICAL PROJECTING MACHINE AND SLIDE CARRIER
Filed Dec. 30, 1922     5 Sheets-Sheet 3
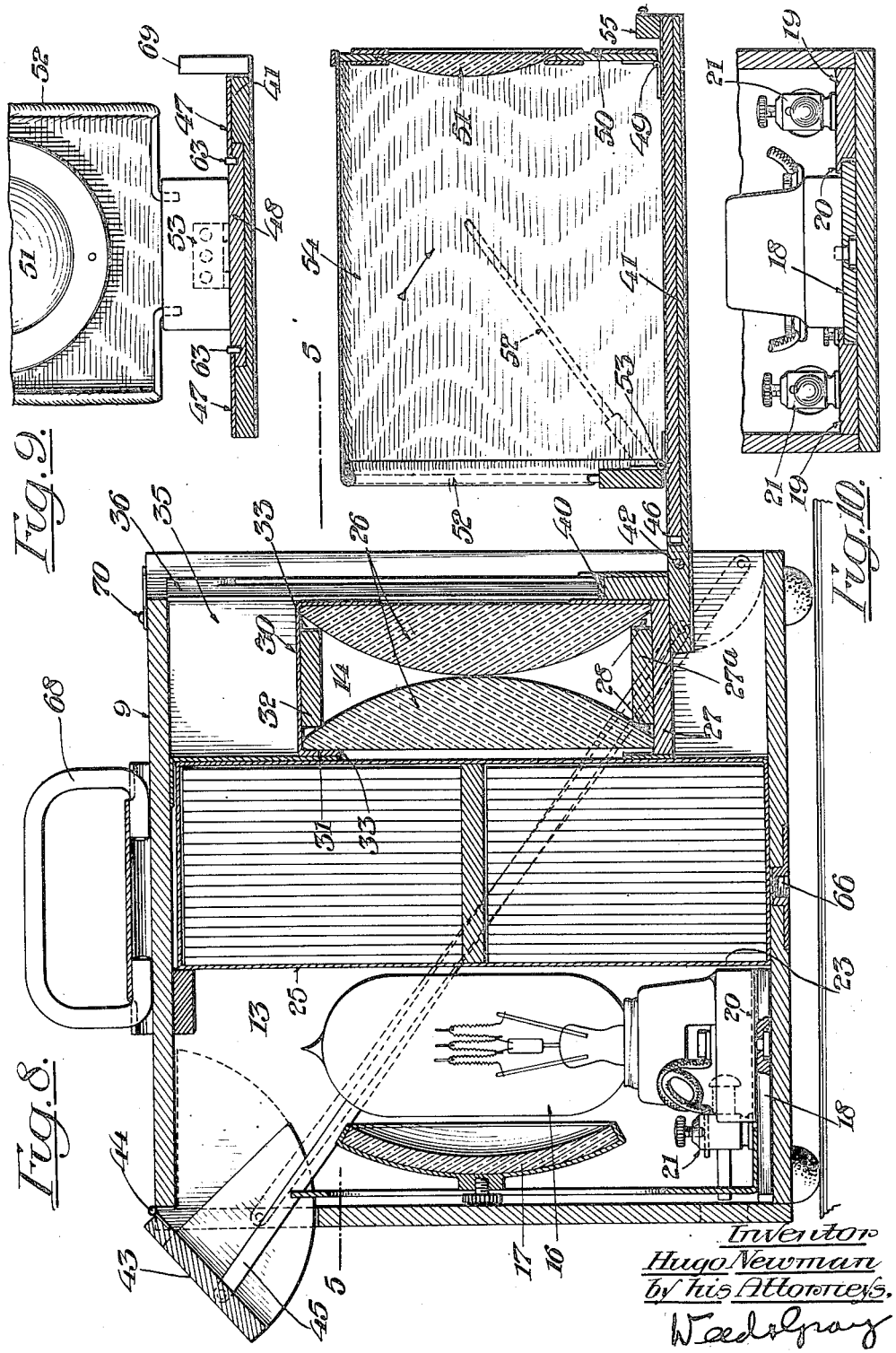
Inventor
Hugo Newman
by his Attorneys

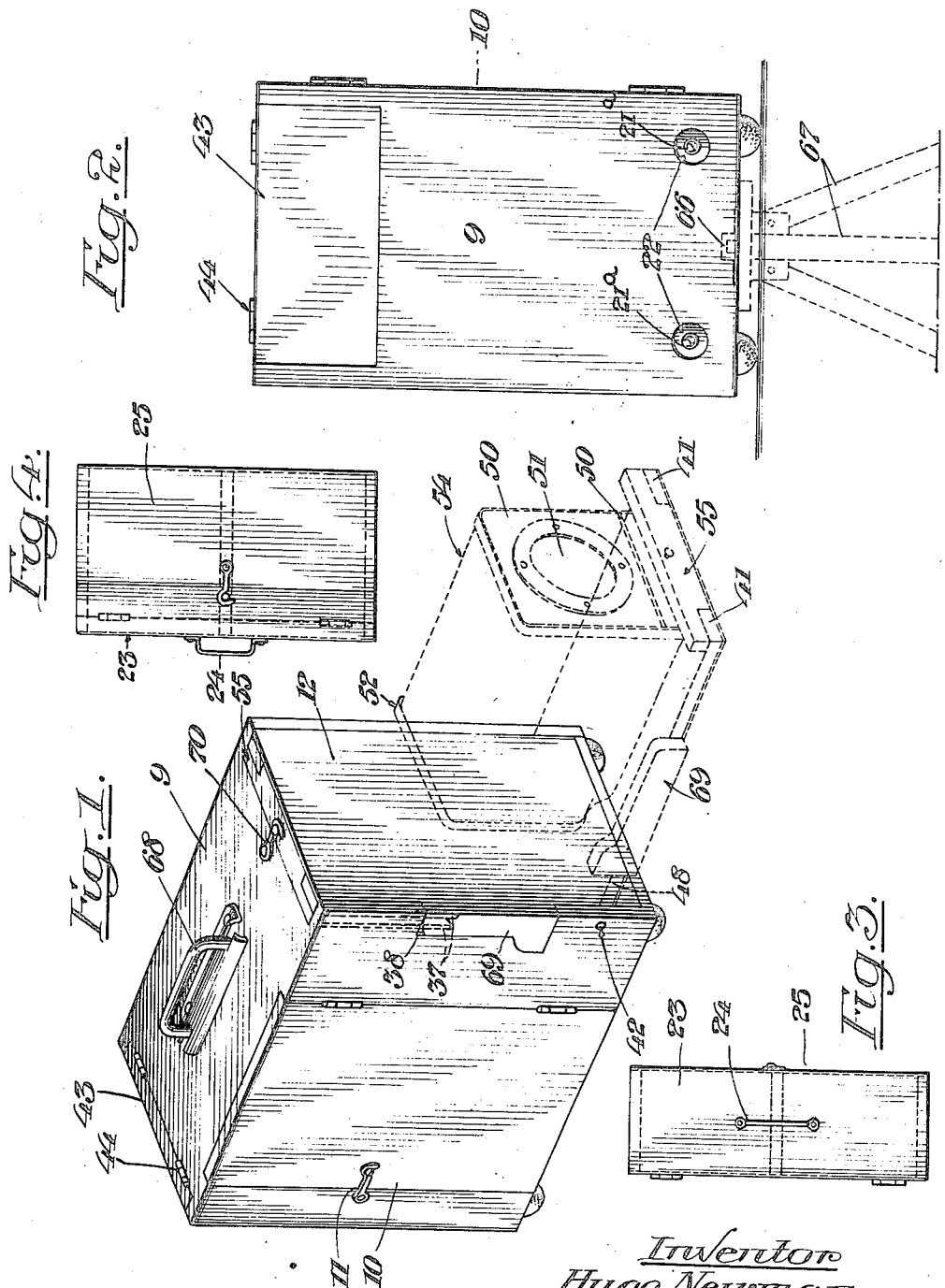

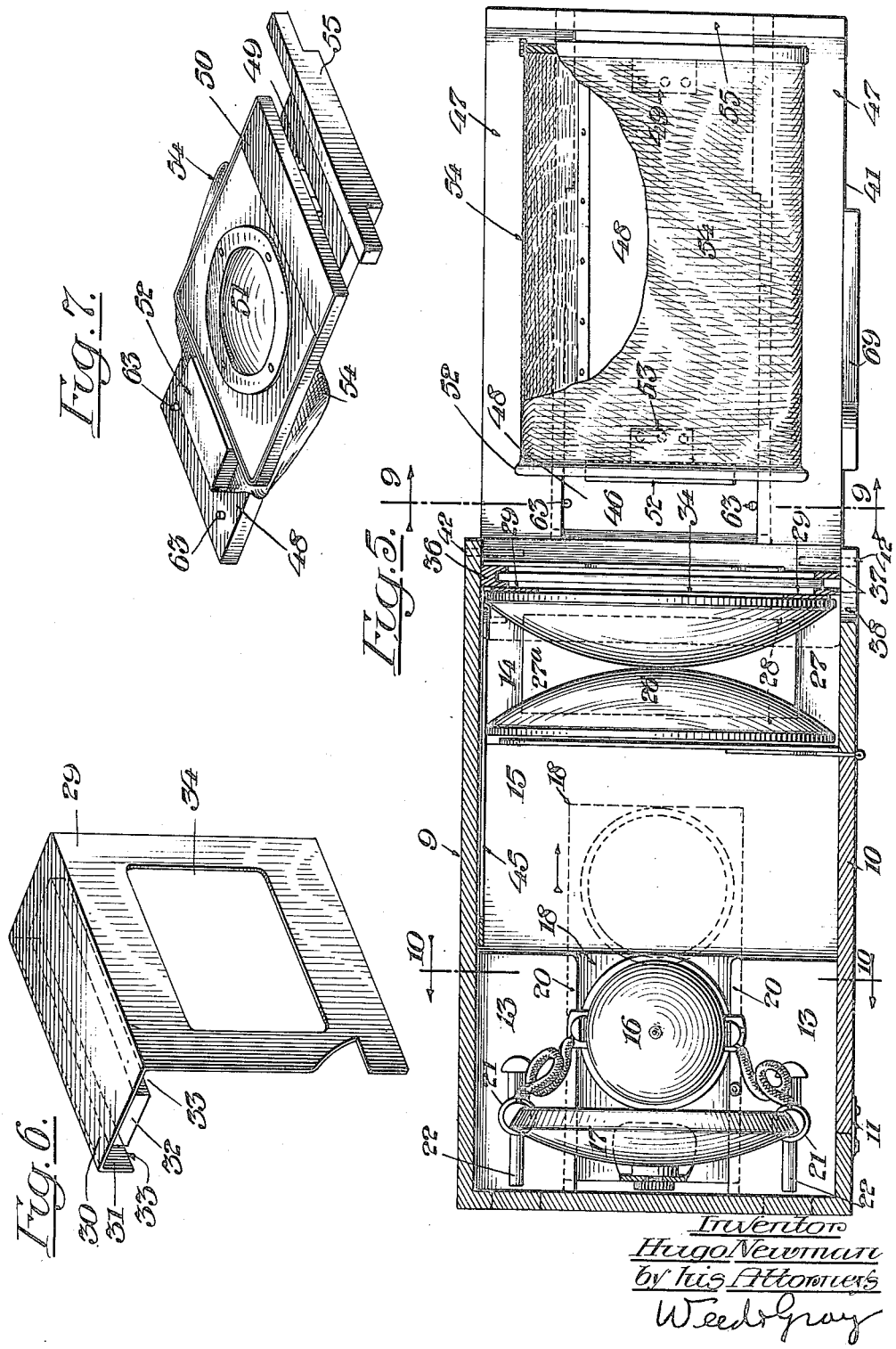

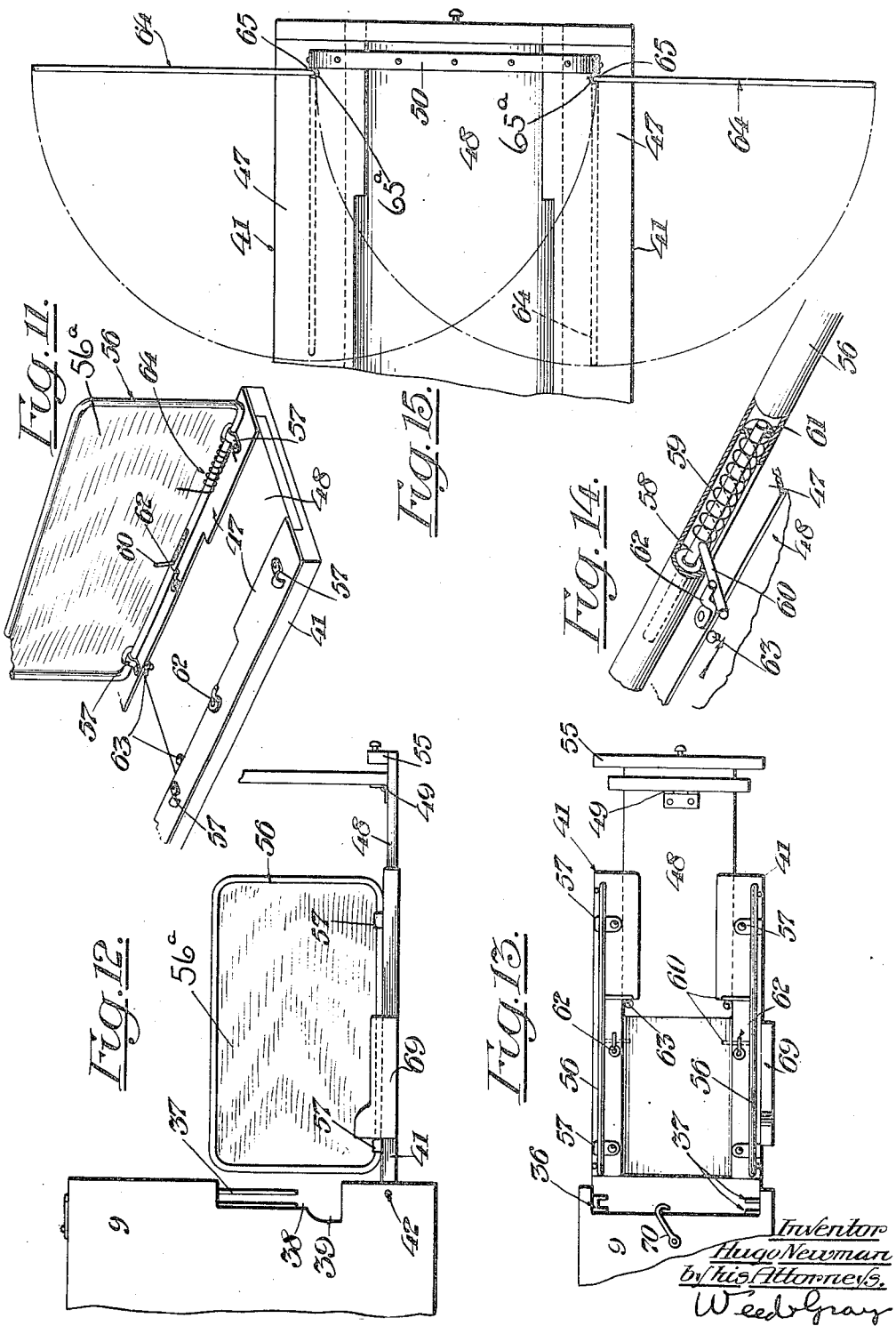

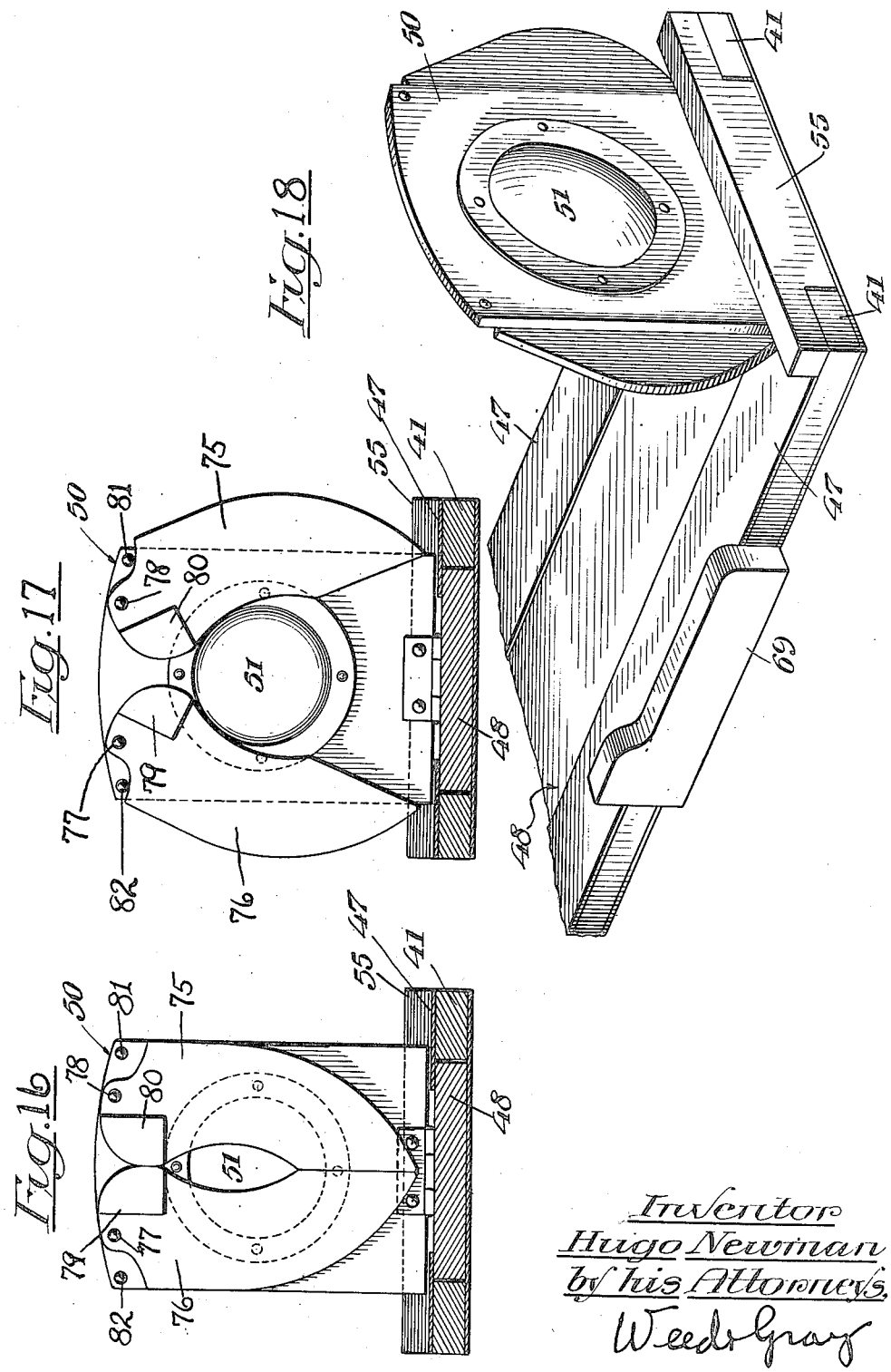

Patented Dec. 30, 1924.

1,521,122

UNITED STATES PATENT OFFICE.

HUGO NEWMAN, OF NEW YORK, N. Y.

COMBINED OPTICAL PROJECTING MACHINE AND SLIDE CARRIER.

Application filed December 30, 1922. Serial No. 609,808.

*To all whom it may concern:*

Be it known that I, HUGO NEWMAN, a citizen of the United States, residing at New York city, in the county of New York and State of New York, have invented certain new and useful Improvements in Combined Optical Projecting Machines and Slide Carriers, of which the following is a specification.

This invention relates to optical projecting mechanism, an object of the invention being to provide a compact, relatively simple, portable, relatively inexpensive, and easily operated machine, contained as a complete unitary structure, for projection of lantern slides and for the storage of the latter when not in use.

Other objects of this invention are to provide in a machine for projecting lantern slides improved means for guiding and manipulating the slides; means for carrying or mounting the condensing lenses in an improved and more advantageous manner; automatically operated means for ventilating the lamp box; improved means for carrying and manipulating the projecting lens; and improved light shielding or excluding means constructed and adapted to be operated or maripulated in an improved and efficient manner.

Other objects of this invention will appear in the following description thereof, reference being had to the accompanying drawings forming a part of this specification, wherein like reference characters indicate corresponding parts in the several views and wherein Fig. 1 is a perspective view illustrating a machine embodying my invention; Fig. 2 is a rear elevation thereof; Fig. 3 is a front end view of a slide box or carrier; Fig. 4 is a front side view of the slide box or carrier. Fig. 5 is a horizontal sectional plan view taken substantially on lines 5—5 of Fig. 8; Fig. 6 is a perspective view of the condensing lens holder; Fig. 7 is a perspective view illustrating the projecting lens slide with the lens and light shield in collapsible position; Fig. 8 is a central longitudinal sectional view of the machine; Fig. 9 is a vertical section taken on lines 9—9 of Fig. 5 and looking in the direction of the arrows; Fig. 10 is a fragmentary section taken on lines 10—10 of Fig. 5; Fig. 11 is a fragmentary perspective view illustrating a modified form of light shield; Fig. 12 is a side elevation illustrating the same form of light shield; Fig. 13 is a plan view thereof; Fig. 14 is a detail illustrating the automatic means for operating the light shield; and Fig. 15 is a plan view illustrating another form of light shield. Fig. 16 is a detail view partly in section showing the light shields in collapsed position.

Fig. 17 is a view similar to Fig. 16 with the light shields swung outwardly.

Fig. 18 is a perspective of the lens frame and light shields.

The entire projecting mechanism in the present invention is compactly housed in a single container or box and the organization is such that all the parts are easily and readily manipulated, thereby providing a machine for projecting lantern slides, which will be contained as a complete unitary structure and at the same time will be relatively simple and portable.

In its present preferred form herein shown and described, the mechanism of this invention is housed in a suitable box or container 9, which may be constructed of any preferred material. The box or container 9 is provided at one side thereof with a hinged door 10 for permitting ingress to the interior of the container, the door being provided with any suitable locking means, such as shown at 11 in Fig. 1. One end of the container is provided with a hinged downwardly swinging portion 41, which may be termed a hinged front, the same forming a closure for the front end of the machine and also when lowered to a horizontal position forming a support for the projecting lens slide and light shield. The lowering of the front portion 12 exposes the front condensing lens and at the same time carries the projecting lens into position.

The main body of the casing or box is divided into three main compartments, namely, a rear compartment 13, a front compartment 14, and an intermediate compartment 15. Within the compartment 13, as shown particularly in Figs. 5 and 8 is normally housed the lamp 16 and suitable parabolic mirror 17. The lamp and mirror are carried by a slide 18 mounted in a guideway formed by guide members 19 preferably overlapping the slide 18 at 20 to form the guideway therefor. Secured to the guide members 19 are suitable binding posts 21, of which the wire terminals 21ª may project through holes 22 in the rear of the casing for connection with a suitable electric light cord. The lamp 16 and mirror 17 may be constructed in any desired manner, the details thereof forming no part of this invention, it being noted however, that the lamp and mirror are adjustable by shifting the supporting slide thereof forwardly in the direction of the arrow as shown in Fig. 5.

The intermediate or central compartment of the box or casing is constructed to receive a slide box or carrier 23 and to house the same when the machine is not in use. This slide box is provided with a handle 24 at its front end and is also provided with a hinged door 25. The slide box or carrier may have a capacity for a large number of slides, such as 40 or 50, and by opening the door 10 in the casing, the same may be inserted into the compartment 15 and readily removed therefrom. It will thus be seen that the construction of the casing or lantern box 9 permits the operator to carry within his machine a large number of slides.

The front compartment 14 is constructed to receive the condensing lenses 26. These lenses are mounted or supported in such a way that they are readily detachable and at the same time no separate container is necessary. A base member 27 is secured adjacent to the bottom of the compartment, and is provided with a central raised portion or block 27ª forming a pair of channels or grooves 28 extending longitudinally of the base 27. A removable lens holder 29 is provided and has a top portion 30 provided with a downwardly extending flange 31, and also having secured thereto a central block 32 forming longitudinally extending grooves or channels 33 corresponding to the channels 28 in the base. The condensing lenses 26 are assembled in position by inserting the edges thereof into the opposed channels or grooves 28 in the base member, whereupon the holder 29 is inserted in position with the channels or grooves 33 in position to engage the upper edges of the lens, the holder being readily forced into position so as to hold the lenses firmly against movement.

The front part of the holder 29 is provided with an opening 34 of suitable size for permitting the passage of the light rays from the lamp 16, the marginal portions of the holder surrounding the opening 34 forming a shield for excluding or cutting off unnecessary light. It will thus be seen that the holder 29 forms a combined condensing lens holder and a light shield, and it will be noted that the top 30 thereof when the holder is in position as shown particularly in Fig. 8 forms a space or compartment 35 adapted for the purpose of storing connecting cord and plugs if desired.

Referring to Figs. 1, 5, 8 and 12, it will be seen that the casing or box 9 at the front thereof is provided with a vertical guide frame for the purpose of receiving and holding the lantern slides in position during the operation of the machine. This guide frame, as in the present instance, may comprise vertical grooved or channeled guides 36 and 37 located in position at each side of the box or casing and immediately in front of the outer condensing lens. These guides 36 and 37 form a vertical guideway, which is open at the top as shown in Fig. 8, so as to permit the slides to be inserted from the top of the machine, one above the other. In order to extract or remove the slides from the guide frame an opening 38 of suitable size is preferably formed at one side of the casing, see particularly Figs. 5 and 12. The vertical guide 27 is likewise open at its lower end, so as to provide an opening registering with the opening 38, the latter being cut away at 39 for the insertion of the thumb and fore finger of the operator when removing the slide from the guide frame. Thus it will be seen that the lantern slides may be inserted at the top of the guides 36 and 37, and as each slide is inserted it falls to the bottom of the guides against a suitable cushioned support 40, see Fig. 8, and automatically assumes a position in optical alinement with the lens mechanism and the electric lamp. A second lantern slide may be inserted in the guide frame, so as to rest upon the slide which is at the bottom of the guide frame, and which is being projected on the screen, and the latter may be removed by inserting the fingers in the opening 38—39 and with a quick pull on the slide, the slide immediately above falling into place by gravity, thereby effecting a rapid change of slides.

As hereinbefore stated, the machine is provided with a downwardly swinging front 41, hinged to the casing at 42. The casing 9 projects forwardly of the guide members 36 and 37 so as to permit the front portion 41 upon swinging the same upwardly to form a closure for the front of the machine. At the rear of the machine a ventilating hood 43 is hinged preferably to the top of the casing as at 44, the casing being formed with an opening so that upon swinging the hood 43 as shown in full and dotted lines in Fig. 8 ventilation may be provided for the interior of the casing. The ventilator 43 is connected by means of a link 45 with the swinging front 41, whereby upon lowering the front to the position shown in Fig. 8 the ventilator 43 will be swung outwardly so as to open the same. Also upon elevating the hinged front 41 so as to close the front of the box the ventilator 43 will be swung downwardly into closed position, as shown in dotted lines in Fig. 8, and also in Fig. 2; thus it is merely necessary to manipulate the drop or hinged front 41 in order to automatically operate the ventilator 43, thereby providing proper ventilation for the machine in use.

The hinged or drop front 41 forms a carrier or support for the projecting lens and for a suitable light shield means.

As shown in Figs. 5 and 9, the front 41 is provided with a central guideway 46 and also with longitudinally extending guide plates 47 overlapping the channel and thereby forming a guideway for a suitable slide 48. Hinged to the forward end of the slide as at 49 is a lens carrying frame 50 constructed to support in any suitable manner a projecting lens 51. Spaced from the hinged frame 50 is a second frame 52 hinged to the slide 48 at 53. A suitable light shield 54 formed preferably of fabric, is connected to the frames 50 and 52, the shield as shown in Figs. 5 and 8 forming substantially a hood for excluding lateral rays of light, the hood or shield being open at the rear thereof. It will be seen from this construction therefore, that the lens carrying frame 50, the frame 52, and the light shield extending therebetween may all be collapsed merely by swinging the frames downwardly toward each other and suitably folding the fabric shield. The forward portion 55 of the slide 48 is shaped so as to fit into the guide opening at the top of the casing (see Fig. 1) and form a tight closure therefor.

Referring to Figs. 11 to 14 inclusive, it will be seen that I have provided a somewhat modified form of light shield for the lenses, and in this instance the shield is automatically operated upon operating the slide and adjusting the projecting lens carried thereby. At opposite sides of the hinged front 41 are mounted a pair of fabric shields 56ª supported by frames 56 having a suitable fabric material (not shown) extending between the tops thereof. Each frame is hinged at 57 to the guide plates 47 so that they can be swung inwardly toward each other. In order to effect automatic operation of the shields, a plunger 58 is mounted in the tubular base portion of the frame (see Fig. 14) and a coil spring 59 surrounds the plunger and is held in position between a projecting trigger or finger 60 and a stop 61. When the shields are collapsed the finger 60 will be swung downwardly and may be inserted beneath a projecting latch 62, thereby holding each shield in collapsed or horizontal position. The slide 48 is provided with lugs or projecting pins 63, which are adapted to engage the fingers or triggers 60 upon shifting the slide forwardly, it being noted that each trigger or finger 60 extends into the path of a lug 63. It will be readily seen therefore, that upon shifting the slide 48 forwardly and upon engagement of the lugs 63 with triggers 60, the latter will be released from the latches 62, and by means of springs 64 the shields 56 will be swung to upright position, as shown in Figs. 11 and 13.

In the construction illustrated in Fig. 15, the slide 48 is provided, as hereinbefore described, with the rearwardly swinging hinged frame 50 for supporting the projecting lens. To this frame are hinged at 65 a pair of swinging shields 64, and by means of suitable springs 65ª these shields will be automatically swung outwardly to the positions shown in full lines in Fig. 15 when the lens frame 50 is raised. When it is desired to close the hinged front 41 of the casing, the shields 64 will be swung, against the action of springs 65ª, into juxtaposition with the lens frame 50, as shown in dotted lines in Fig. 15, whereupon the frame 15 may be collapsed as hereinbefore described. In this instance also therefore, the light shielding means is self-opening upon raising the lens support into position.

The box or casing may be provided with a suitable socket 66 (see Figs. 2 and 8) for a tripod support 67, and a suitable handle 68 is provided for carrying the machine. When the front of the box is closed, the openings 38 and 39 are also closed by means of a suitable piece 69, which is carried by the hinged front 41 and is so shaped as to fit into these openings. In its closed position the swinging front 41 may be held by any suitable locking means, such as shown at 70.

In the construction shown in Figs. 16 to 18 inclusive, the hinged lens frame or support 50 is provided with lateral light shields which are also self-opening upon raising the lens frame and which are adapted to cut off light rays from the condensing lens at each side of the frame 50, thereby preventing a halo of light from being formed around the picture on the screen. In this instance, a pair of similar shield members 75 and 76, which are preferably formed of metal are pivoted at 78 and at 77 respectively to the frame support 50. The shield members are weighted in any suitable manner at 79 and 80 at points inwardly of the pivots thereof, so that when the frame 50 is swung into upright position, the weights will automatically swing the shields outwardly from the positions shown in Fig. 16 to the positions in Fig. 17. Stops 81 and 82 are carried by the frame 50 and located in position to limit the outward swinging movement of the shields at predetermined positions thereof.

It will be noted that the shields 75 and 76 are shaped so as to fit within the area of the frame 50, as shown in Fig. 16, when they are collapsed. In this position the hinged lens frame may also be collapsed and the machine closed by closing the hinged front 41 as hereinbefore described.

It is to be understood that by describing in detail herein any particular form, structure, or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. A projecting machine comprising a casing having a lamp compartment, a condensing lens compartment, a lantern slide box compartment, means for permitting access to said last compartment, and a slide box slidably mounted therein for removal.

2. A projecting machine comprising a casing having a lamp compartment at the rear thereof, a condensing lens compartment adjacent to the front thereof, a lantern slide box compartment between said compartments, a slide box removably carried therein, a swinging front, and a projecting lens carried thereby.

3. A projecting machine comprising a casing having a swinging front, a projecting lens carried thereby, a ventilator, and means connected to said front for automatically operating said ventilator.

4. A projecting machine comprising a casing having a hinged front, a lens slide carried thereby, a projecting lens supporting frame hinged to said slide, and a collapsible light shield independently carried by said slide.

5. A projecting machine comprising a casing having a shiftable front, a projecting lens carried thereby, a shiftable ventilator carried by said casing, and means for operating said ventilator from said shiftable front.

6. A projecting machine comprising a casing having a downwardly swinging front portion, and a shiftable ventilator, means for connecting said front portion and ventilator whereby the latter will be automatically opened and closed upon swinging said front portion.

7. A projecting machine comprising a casing, and lantern slide guide means carried thereby, said means having spaced vertical guide channels, a slide receiving opening at the top side, a slide receiving opening at another side, and a front opening therebetween located in substantial alinement with said last opening.

8. A projecting machine comprising a casing, and lantern slide guide means carried thereby, said means having a front opening and having spaced vertical guide grooves terminating at the top in a slide receiving opening, and also having an opening extending through one of the guide grooves for permitting removal of a slide and located in substantial alinement with said front opening.

9. A projecting machine comprising a casing having vertical slide guide means and a hinged front portion, said guide means having an opening at the top and said front portion having at its free end projecting means swingable with the front portion into position above said opening for closing said opening.

10. A projecting machine comprising a casing having slide guide means and a hinged front portion, said guide means having a side opening, and said front portion having means for closing said opening.

11. A projecting machine comprising a casing having a projecting lens slide support, a slide carried by said support, a projecting lens carried by said slide, collapsible light excluding means independently carried by said support, and means for automatically collapsing said last means upon movement of said slide.

12. A projecting machine comprising a casing having a swinging front portion, an adjustable lens slide mounted thereon, a ventilating member for the casing, and a light shield for the lens, means for automatically operating said ventilating member from said front portion, and means for automatically operating said light shield from said slide.

13. A projecting machine comprising a casing having a lamp compartment and an adjustable lamp carried therein, a condensing lens compartment and a condensing lens therein, a slide carrier compartment, means for permitting access thereto, a slide carrier removably mounted therein, a ventilator, a shiftable front portion, and means for connecting said ventilator to the front portion for automatic operation therewith.

14. A projecting machine comprising a casing having a lamp compartment, a condensing lens compartment, a slide carrier compartment, means for permitting access thereto, a slide carrier removably mounted therein, a ventilator, vertical lantern slide guide means, said casing having a front portion hinged for swinging movement toward and from said guide means, and means for connecting said ventilator to the front portion for automatic operation therewith.

15. A projecting machine comprising a housing having a swinging front portion, means carried by said front portion for supporting a projecting lens, and self opening light shields independently carried by said front portion.

16. A projecting machine comprising a housing having a swinging front portion, hinged means carried thereby for supporting a projecting lens, self-opening light shields independently carried by said front portion and connected to said means and adapted to automatically open upon swinging said hinged means into predetermined position.

17. A projecting machine comprising a housing, a shiftable front portion carried thereby, a hinged support carried by said front portion for supporting a projecting lens, a projecting lens carried thereby, a pair of shiftable light shields connected to said hinged support, and means for automatically shifting said light shields upon swinging said hinged support into predetermined position.

18. In a machine of the class described the combination of a housing, a swinging front hinged thereto, an adjustable lens support swingingly carried by said front, a projecting lens carried thereby, pivoted light shields and means for automatically operating said shields upon shifting the lens support into predetermined position.

Signed at 1822 Park Row Bldg. New York, New York, this 23rd day of December 1922.

HUGO NEWMAN.